(12) United States Patent
Muxlow

(10) Patent No.: US 6,845,588 B2
(45) Date of Patent: Jan. 25, 2005

(54) AUTOMATIC PLANT WATERING SYSTEM

(76) Inventor: Maurice Alvin Muxlow, #115-1450 McCallum Rd., Abbotsford B.C. (CA), V2S 8A5

( * ) Notice: Subject to any disclaimer, the term of this patent is extended or adjusted under 35 U.S.C. 154(b) by 48 days.

(21) Appl. No.: 10/237,273

(22) Filed: Sep. 9, 2002

(65) Prior Publication Data

US 2004/0045218 A1 Mar. 11, 2004

(51) Int. Cl.$^7$ ................................................. A47G 7/04
(52) U.S. Cl. .............................................. 47/67; 251/5
(58) Field of Search ................................ 47/67, 79, 86; 248/317, 318; 119/72, 81; 137/403; 251/7, 5

(56) References Cited

U.S. PATENT DOCUMENTS

| | | | | |
|---|---|---|---|---|
| 1,063,395 A | * | 6/1913 | Scribner | 47/67 |
| 2,066,169 A | * | 12/1936 | Zwosta | 141/196 |
| 2,588,212 A | * | 3/1952 | Willis | 251/5 |
| 3,108,400 A | * | 10/1963 | Wolfe, Jr. | 47/18 |
| 3,293,799 A | * | 12/1966 | Keller et al. | 47/79 |
| 3,438,604 A | * | 4/1969 | Spicer | 248/74.5 |
| 4,241,538 A | * | 12/1980 | Lahr | 47/79 |
| 4,516,533 A | * | 5/1985 | Mallinson | 119/72 |
| 4,562,959 A | * | 1/1986 | Pointer, Jr. | 239/38 |
| 4,760,666 A | * | 8/1988 | Han | 47/79 |
| 4,825,591 A | * | 5/1989 | Han | 47/67 |
| 4,848,029 A | * | 7/1989 | Han | 47/79 |
| 5,848,494 A | * | 12/1998 | Spelt | 47/67 |
| 6,161,329 A | * | 12/2000 | Spelt | 47/67 |
| 6,536,738 B2 | * | 3/2003 | Inoue et al. | 251/5 |
| 2004/0045218 A1 | * | 3/2004 | Muxlow | 47/79 |

FOREIGN PATENT DOCUMENTS

| | | | | | |
|---|---|---|---|---|---|
| GB | 2095083 A | * | 3/1981 | | A01G/27/00 |
| GB | 2190573 A | * | 11/1987 | | A01G/27/00 |
| GB | 2246418 A | * | 1/1992 | | F16K/31/00 |
| GB | 2267552 A | * | 12/1993 | | A01G/27/00 |
| GB | 2287632 A | * | 9/1995 | | A01G/27/00 |
| GB | 2305591 A | * | 4/1997 | | A01G/27/00 |

* cited by examiner

Primary Examiner—Jeffrey L. Gellner

(57) ABSTRACT

This invention provides a method and apparatus for automatically watering plants. The system is connected directly to a city or municipal water supply. Water is fed from the supply source through small diameter polyethylene tubing to a control valve or multiple valves which regulate the amount of water supplied to each plant. What is new in this invention is that the apparatus is simple in its operation, and is simple and inexpensive to manufacture. This invention should have a very long life with little or no maintenance. The control valve is self cleaning and non-clogging.

16 Claims, 3 Drawing Sheets

AUTOMATIC PLANT WATERING SYSTEM

BACKGROUND OF THE INVENTION

Various arrangements for automatic irrigation of plants are well known to the art. U.S. Pat. No. 3,753,315 is illustrative of a double pot system in which an aperture is located on or near the bottom of an inner pot and a sponge located between the bottom of the inner container and above the inside bottom of an outer container. Water is transferred from the outer container to a cavity containing the sponge and, through capillary action, the water moves upwardly from the sponge through the aperture in the inner pot to moisten the plant soil. One problem associated with the device has been the difficulty of controlling the amount of water transferred to the plant. Quite often such types of plant watering systems have not proved satisfactory as soil often becomes water saturated and causes rotting of the plant roots.

Another form of automatic watering device is shown in U.S. Pat. No. 4,825,591 in which a plant hangs from one end of a vertical rod with a spring at the opposite end of the rod for actuating a valve in a water tank. As the soil dries and becomes lighter, the spring lifts the plant and triggers a water tank valve to allow water to flow to the plant. The complexity of this apparatus makes it susceptible to high failure rates and its size and complexity are not cost effective for mass watering.

SUMMARY OF THE INVENTION

My plant watering system provides a controlled supply of water to the plants, based on the optimum moisture content required to promote the best growth. The system is connected to any city water supply through small diameter tubing. This single tubing may be branched off to supply multiple plants. As water is fed to the plant, the increasing weight will cause the simple shut-off gate to bear against the plastic tubing and the tension spring, thereby cutting off the water supply to the plant. The cut-off point is determined by the adjustable setting of the tension spring. As water evaporates from the pot reducing its weight, the tension spring will cause the pressure on the tubing to be reduced, allowing water to flow to the plant. As the plant matures, minor adjustments will be required to maintain the desired amount of moisture. Furthermore, because of the slow flow rate inherent to the system, the water will be warmed to the ambient temperature before it reaches the plant. My valve design is non-clogging and self cleaning. Unlike previously mentioned systems that use water tanks which require filling from time to time, my system is connected directly to the city water supply. The apparatus in my invention is simple in design, inexpensive to manufacture and should give a long and trouble free life.

BRIEF DESCRIPTION OF THE DRAWINGS

Referring to the drawings, FIG. 1 shows the distribution system is made up of polyethylene tubing (10), vinyl tubing (7) and tubing fittings. The vinyl tubing is used through the water regulator apparatus because of its more pliable properties. The polyethylene tubing is used on the supply side because it is more rigid and will stand the pressure from the supply source. The water supply apparatus includes a main frame (1), a hanger (2) from which the frame is suspended, a gate (8) and another hanger (3) to which the plant is hung. Also a spring (4), which is attached to a threaded bolt (5) and a threaded adjustment wheel (6) provides a method for adjusting the amount of water supplied and provision to take into account various weights of plants.

Figure 1:
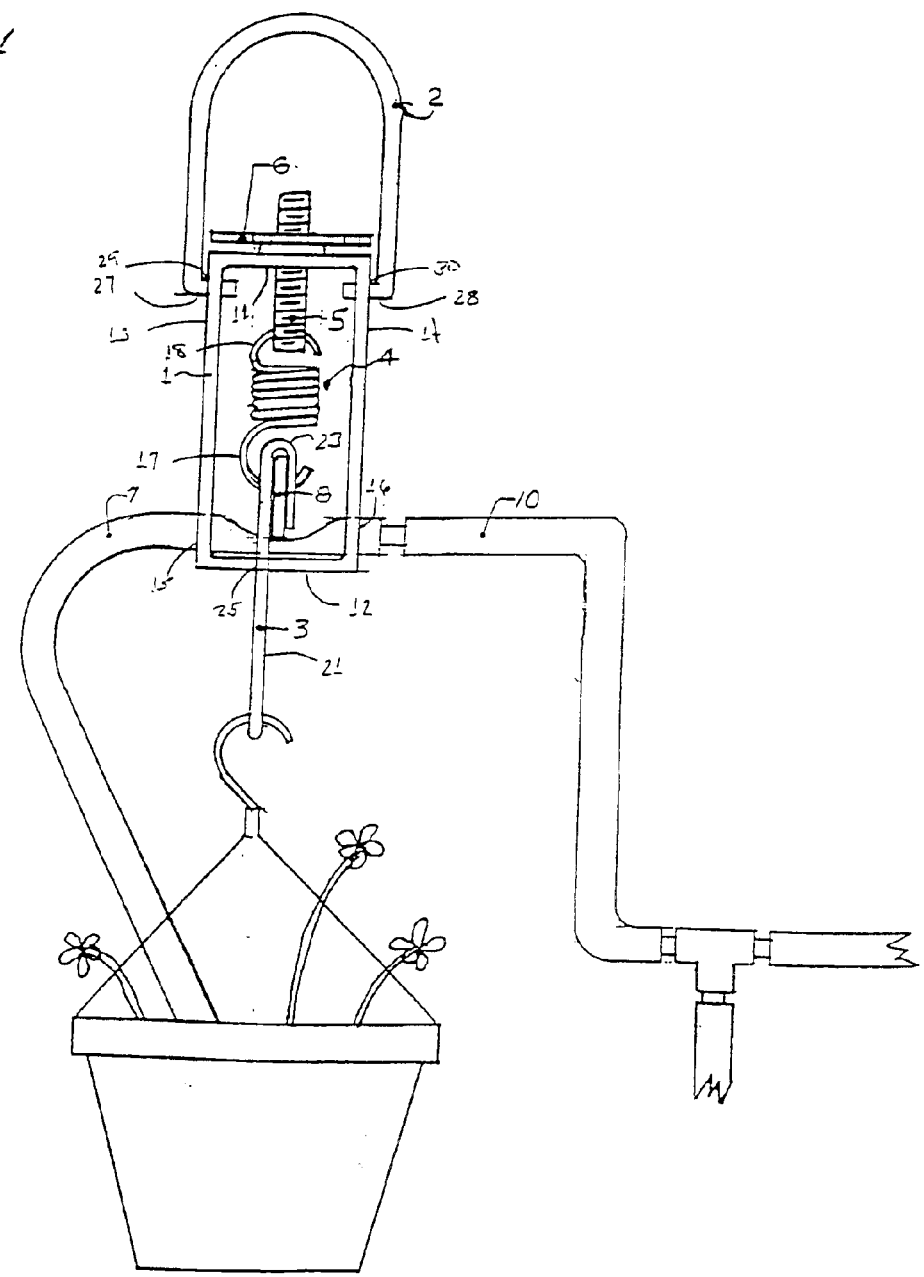
FIG. 1. is an elevational, environmental view of an automatic watering system in accordance with the present invention, showing the manner in which the apparatus pinches the flexible supply tubing to control the flow of water therethrough.

As shown on the drawing, other plants and associated apparatus may be supplied from the same supply line.

As can be seen in FIG. 1, the frame is hollow and has a substantially rectangular configuration. Upper and lower end walls 11, 12 are connected by opposing side walls 13, 14 on two sides, the remaining sides 34 of the frame being open. Coaxially aligned bores 15, 16 are formed in the lower ends of the side walls to form a receiving area for a section of the flexible tubing, so that this will be positioned between the lower edge of the gate 8 and the lower end wall 12.

As noted above, the gate 8 is attached to the lower end of the tension spring 4, suitably by means of a hook 17 on the lower end of the spring that passes through a cooperating bore in the narrow metal plate that forms the gate. Similarly, the upper end of the spring is provided with a hook 18 which passes through a bore in the lower end of bolt 5.

As can be seen with further reference to FIG. 1, the gate 8 is free from direct attachment to the frame 1 and is therefore free to move with the lower end of the tention spring. The outer ends 19, 20 (see FIG. 2) of the gate project out from the open sides of the frame and provide mounting areas for attachment of the upwardly extending legs 21, 22 of the U-shaped lower hangar 3. In the illustrated embodiment, the upper ends of the legs are bent downwardly to form hooks 23, 24 that extend over and engage the projecting ends 19, 20 of the gate so as to support the hangar therefrom. The two legs 21, 22 are received and slide within grooves 25, 26 on opposite edges of the lower end wall of the frame, so that the gate is maintained in its orientation transverse to the tubing as the mechanism works up and down.

Figure 2:
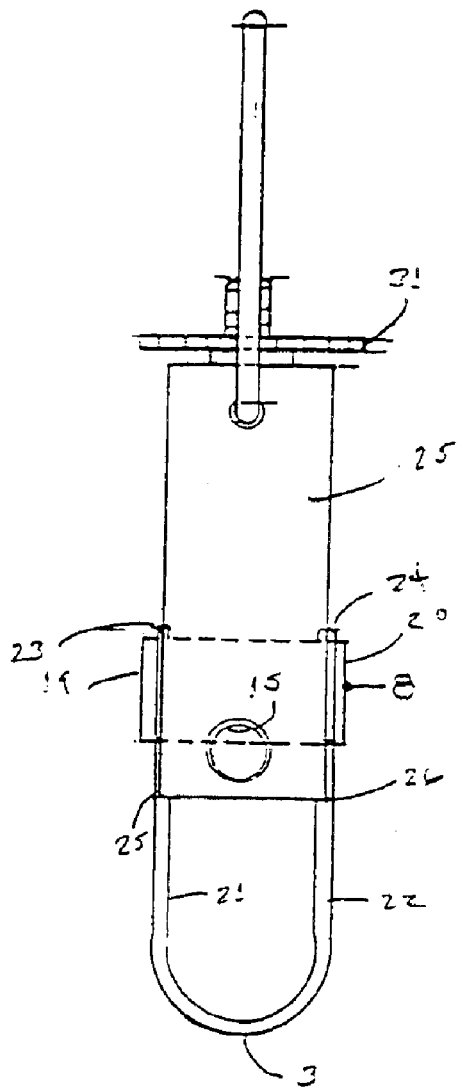
FIG. 2. is a side, elevational view of the water control apparatus of the watering system of FIG. 1, showing the structure of the apparatus in greater detail.
Figure 3:
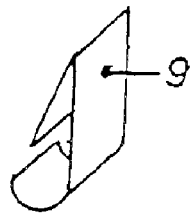
FIG. 3. is a perspective view of a support clip for attaching the water supply tubing to a fascia board or similar structure.
Figure 4:
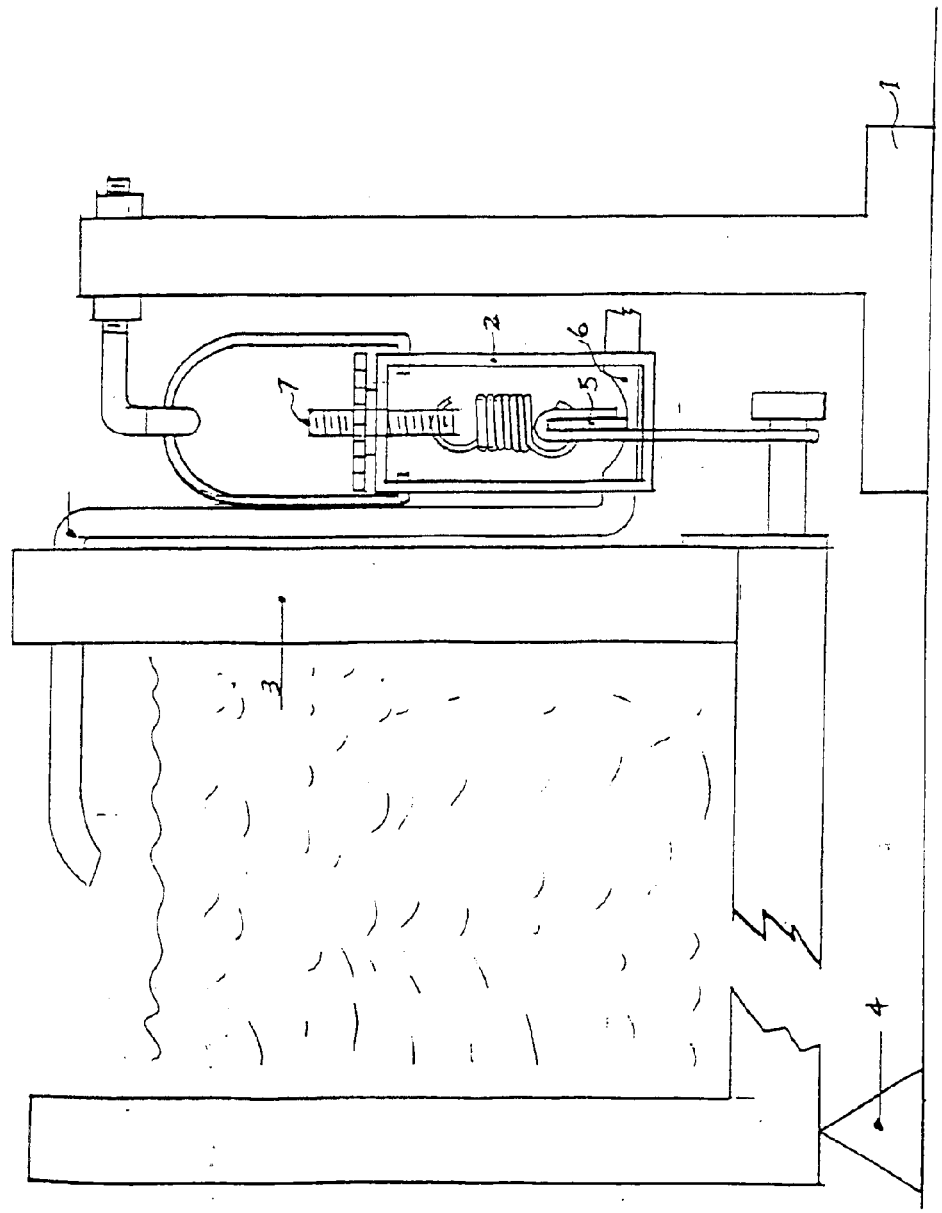
FIG. 4. is an elevational, environmental view, partly in cross section, showing the water control apparatus of FIGS. 1–2 installed to control the flow of water to a planter box instead of a hanging basket.

The upper hangar 2, in turn, is bail-shaped and has inwardly-directed ends 27, 28 that fit within cooperating bores 29, 30 formed near the upper ends of the two sidewalls of the frame. As can be seen in FIGS. 1–2, the wheel portion 31 of the adjuster nut has a diameter greater than the width of the upper end wall 11 so that the edge of the reel is easily accessible by the user's fingers at the front and back of the device; the length of the end wall, (i.e., the distance between the outer surfaces of the side walls 13, 14), in turn, is approximately equal to or slightly greater than the diameter of the wheel portion, so that the wheel portion is spanned by the bail-shaped upper hangar with adequate clearance for movement between the two pieces.

As water flows through the water flow regulator apparatus to the plant pot, the pot gets heavier and causes the gate (8) to bear down on the vinyl tubing (7) restricting the flow of water until it is finally cut off As water evaporates from the pot, the pot gets lighter relieving pressure on gate (8), allowing water to take the place of the water that evaporated. The spring (4) attached to the gate at one end and to the screw (5) and adjusting nut (6) at the other end, provides a means of varying the effect of the gate (8) on the flow of water to the pot. Tightening the tension on the spring will allow more water to flow. Relieving the tension will allow less water to flow. The range of adjustment is also sufficient to accommodate different weights of plants. The setting of the spring tension is determined by the ideal combined weight of the pot, the plant and the water, which provides optimum moisture level to the plant. Clip (9) is designed to be used to fasten the supply lines to the under eve. The clip is designed to wedge between the fascia board and the eve trough.

FIG. 2 shows the application of the invention when used on a planter box. The free standing base (1) supports the water flow control apparatus (2) at one end. One side of the planter box (3) is attached to the other end of the flow control apparatus. The other side of the planter box is mounted on a fulcrum (4). As with the hanging basket, when water flows through the flow control apparatus, the planter will gain weight causing the gate (5) to bear down on the vinyl tubing (6), cutting off the water supply. The cut-off point is determined by the setting of the adjusting screw (7). As water evaporates from the planter it will lose weight allowing the gate to raise and allow more water to flow to the planter to replace that lost through evaporation.

What is claimed:

1. An apparatus for automatic irrigation of plants, comprising:
    a frame having opposing, spaced apart upper and lower portions;
    means for attaching said upper portion of said frame to a support so as to suspend said apparatus therefrom;
    a threaded shaft that extends downwardly from said upper portion of said frame towards said lower portion thereof;
    an adjuster nut in threaded engagement with said shaft above said upper portion of said frame for selectively adjusting a length of said shaft that extends below said upper portion;
    a tension spring having an upper end mounted to a lower end of said shaft, said tension spring comprising:
        a coil tension spring having a first hook at said upper end thereof that
    passes through a bore in said lower end of said shaft, and a second hook at said lower end thereof;
    a gate member mounted to a lower end of said tension spring proximate said lower portion of said frame, said gate member having a bore through which said second hook of said tension spring passes, said gate member comprising a lower edge portion that extends transversely across said flexible tubing in said receiving area and being free from direct engagement with said frame so as to be free to shift on said lower end of said tension spring;
        a receiving portion of said frame for holding a section of flexible tubing in
    a position intermediate said gate member and said lower portion of said frame;
    and
    means for attaching a plant container to said gate member so that said plant container is suspended therefrom;
    so that in response to an increased weight of water in said container said gate member is drawn downwardly against said tubing so as to pinch off flow therethrough, and in response to a reduced weight of water in said container said gate member is retracted upwardly from said tubing so as to reopen flow therethrough.

2. The apparatus of claim 1, wherein said upper and lower portions of said frame comprise upper and lower end walls of said frame.

3. The apparatus of claim 2, wherein said frame further comprises:
    first and second side wails interconnecting said upper and lower end walls on first and second opposite sides of said frame, third and fourth sides of said frame being open.

4. The apparatus of claim 3, wherein said receiving a portion comprises:
    first and second substantially coaxial bores formed in said first and second side walls of said frame for passage of said section of flexible tubing therethrough.

5. The apparatus of claim 4, wherein said gate member further comprises:
    first and second end portions that project outwardly at said open third and fourth sides of said frame.

6. The apparatus of claim 5, wherein said means for attaching a plant container to said gate member comprises:
    a U-shaped hanger having first and second upwardly extending legs that are mounted to said projecting end portions of said gate member.

7. The apparatus of claim 6, wherein said lower end wall of said frame comprises:
    first and second guide grooves formed in opposite edges of said lower end wall that receives said legs of said U-shaped hanger in sliding engagement therewith.

8. The apparatus of claim 6, wherein said legs of said U-shaped hanger comprise:
    downwardly bent end hooks that extend over upper edges of said end portions of said gate member so as to support said hanger therefrom.

9. The apparatus of claim 6, wherein said means for attaching said upper portion of said frame to a support comprises:
    a bail-shaped hanger having first and second lower ends that are pivotably mounted in cooperating bores in said first and second side walls of said frame.

10. The apparatus of claim 9, wherein said adjuster nut comprises:
    a wheel portion for manual rotation of said adjuster nut, said wheel portion having a diameter larger than a width of said upper end wall of said frame so that an edge of said wheel portion projects at said third and fourth sides of said frame.

11. An apparatus for automatic irrigation of plants, comprising:
    a hollow, substantially rectangular frame comprising upper and lower end walls and first and second side walls interconnecting said upper and lower end walls on first and second sides of said frame, third and fourth sides of said frame being open;
    first and second substantially coaxially aligned bores formed proximate lower ends of said first and second side walls of said frame so as to form a receiving area for holding a section of flexible tubing adjacent an upper surface of said lower end wall of said frame;
    a hanger mounted to an upper end of said frame for attaching said frame to a support so that said apparatus is suspended therefrom;

a threaded shaft that extends through a bore in said upper end wall of said frame, said shaft having an upper end that extends upwardly above said upper end wall and a lower end that extends downwardly therefrom towards said lower end wall;

an adjuster nut in threaded engagement with said upwardly projecting upper end of said shaft for adjusting a length of said lower end of said shaft that projects downwardly from said upper end wall, said adjuster nut comprising an outwardly projecting wheel portion for manual rotation of said adjuster nut;

a coil tension spring having an upper end that is mounted to said lower end of said threaded shaft;

a gate member mounted to a lower end of said tension spring and being free from direct engagement with said frame so that said gate member is free to shift with said lower end of said spring, said gate member comprising first and second end portions that project at said open sides of said frame and a lower edge that engages and extends transverse to said section of flexible tubing in said receiving area; and a U-shaped hanger member for attaching a plant container to said gate member so that said plant container is suspended therefrom, said U-shaped hanger comprising first and second upwardly extending legs having upper ends mounted to said projecting end portions of said gate member; so that in response to an increased weight of water in said container said gate member is drawn downwardly against said tubing so as to pinch off flow therethrough, and in response to a reduced weight of water in said container said gate member is retracted upwardly away from said tubing so as to reopen flow therethrough.

12. The apparatus of claim 11, wherein said lower end wall of said frame comprises:

first and second guide grooves formed in opposite edges of said lower end wall that receive said legs of said U-shaped hanger in sliding engagement therewith.

13. The apparatus of claim 11, wherein said hanger mounted to said upper end of said frame comprises:

a bail-shaped hanger having first and second inwardly-directed lower ends that are received in cooperating bores in said first and second side walls of said frame in pivoting engagement therewith.

14. An apparatus for automatic irrigation of plants, comprising:

a frame comprising opposing, spaced apart upper and lower end walls and first and second side walls interconnecting said upper and lower end walls on first and second opposite sides of said frame, third and fourth sides of said frame being open;

means for attaching said upper portion of said frame to a support so as to suspend said apparatus therefrom;

a threaded shaft that extends downwardly from said upper portion of said frame towards said lower portion thereof;

an adjuster nut in threaded engagement with said shaft above said upper portion of said frame for selectively adjusting a length of said shaft that extends below said upper portion;

a tension spring having an upper end mounted to a lower end of said shaft;

a gate member mounted to a lower end of said tension spring proximate said lower portion of said frame, said gate member comprising a lower edge portion that extends transversely across said flexible tubing in said receiving area and being free from direct engagement with said frame so as to be free to shift on said lower end of said tension spring, said gate member further comprising first and second end portions that project outwardly at said open third and fourth sides of said frame;

a receiving portion of said frame for holding a section of flexible tubing in a position intermediate said gate member and said lower portion of said frame, said receiving portion comprising first and second substantially coaxial bores formed in said first and second side walls of said frame for passage of said section of flexible tubing therethrough; and means for attaching a plant container to said gate member so that said plant container is suspended therefrom;

so that in response to an increased weight of water in said container said gate member is drawn downwardly against said tubing so as to pinch off flow therethrough, and in response to a reduced weight of water in said container said gate member is retracted upwardly from said tubing so as to reopen flow therethrough.

15. The apparatus of claim 14, wherein said means for attaching a plant container to said gate member comprises:

a U-shaped hanger having first and second upwardly extending legs that are mounted to said projecting end portions of said gate member.

16. The apparatus of claim 15, wherein said lower end wall of said frame comprises:

first and second guide grooves formed in opposite edges of said lower end wall that receives said legs of said U-shaped hanger in sliding engagement therewith.

* * * * *